Patented July 20, 1937

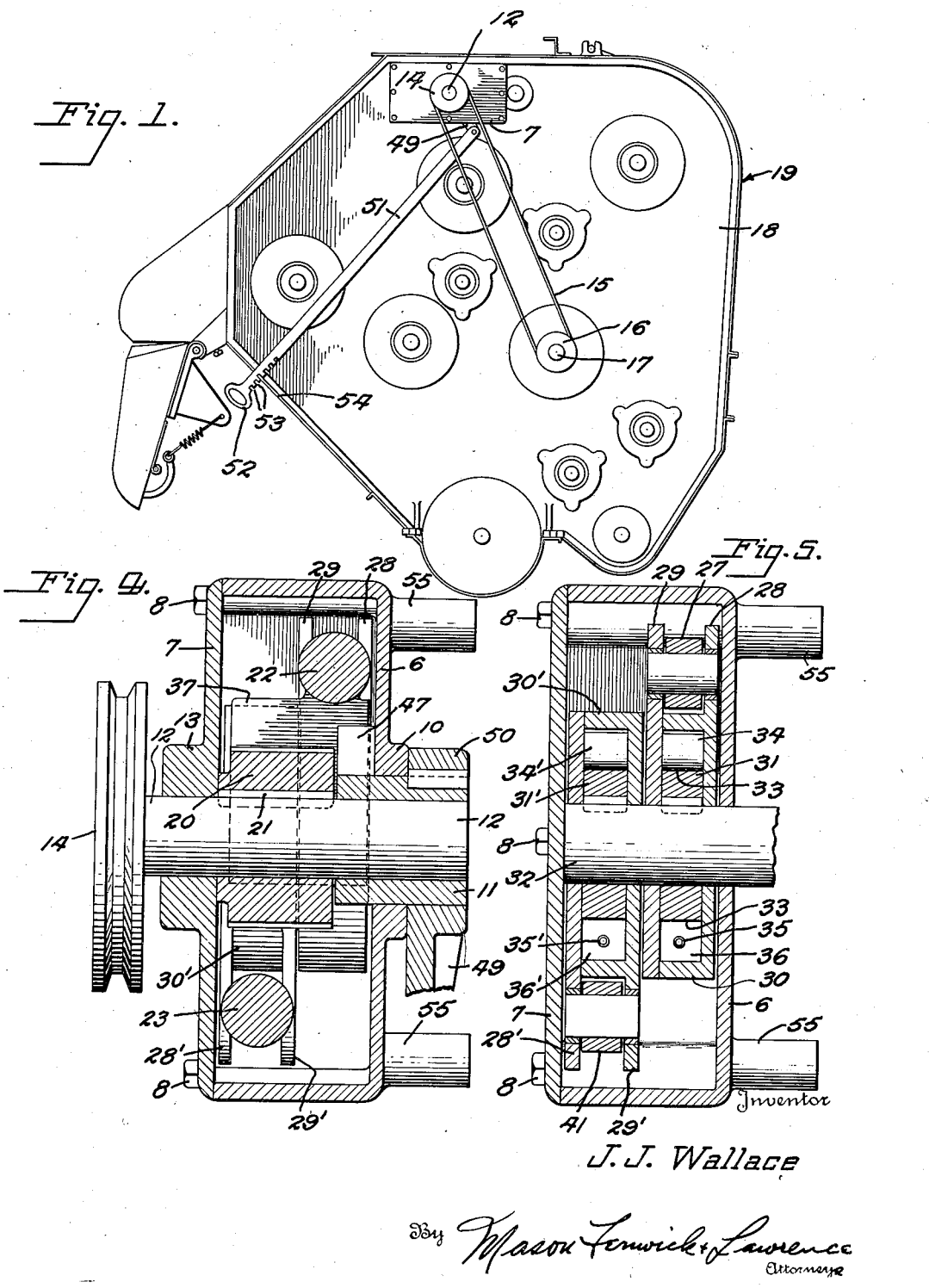

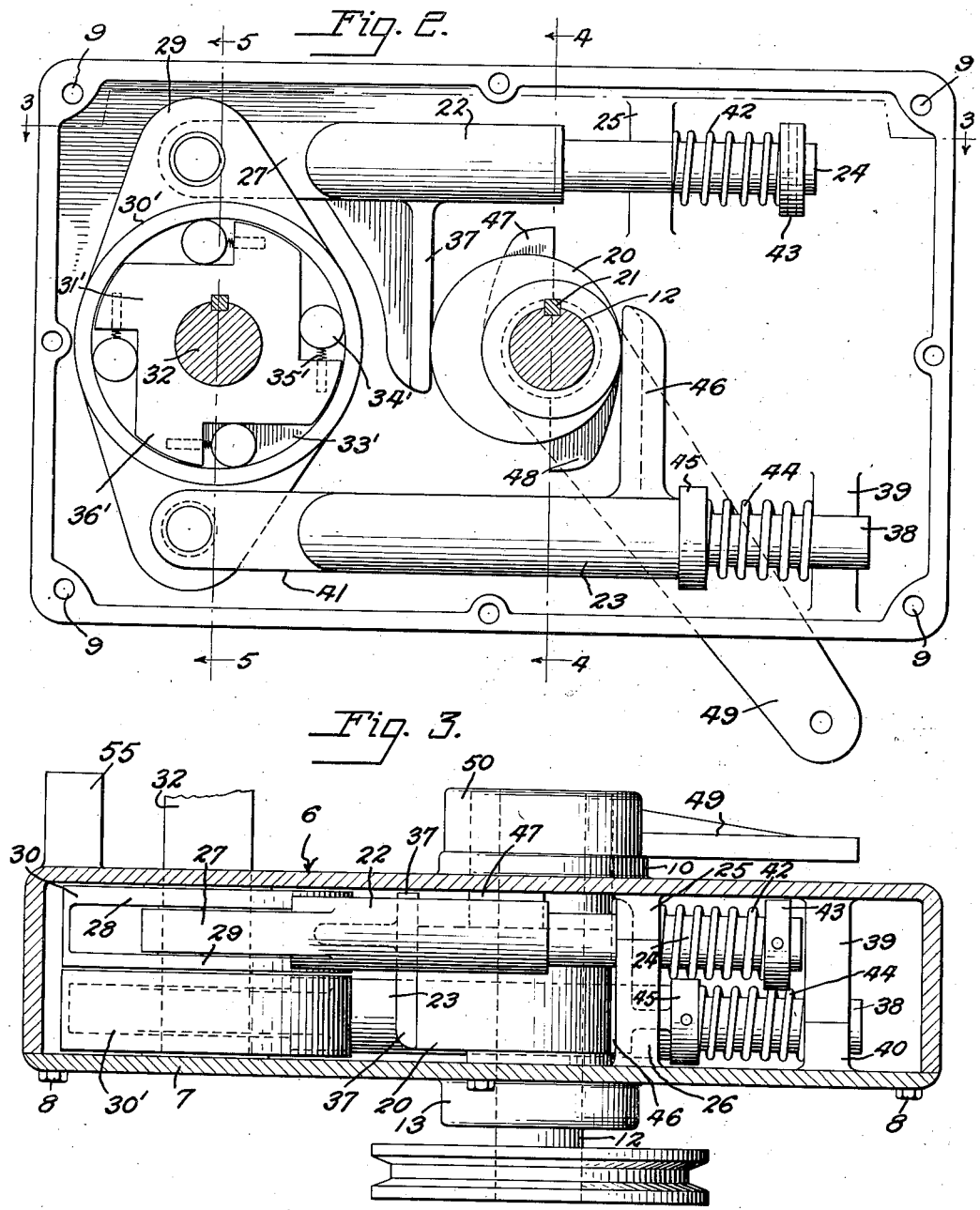

2,087,562

UNITED STATES PATENT OFFICE 2,087,562

VARIABLE SPEED OPERATING MECHANISM FOR COTTON CLEANING FEEDERS

Jeffrey John Wallace, Amite, La., assignor to Gullett Gin Company, Amite, La.

Application December 30, 1936, Serial No. 118,361

8 Claims. (Cl. 74—124)

This invention relates generally to hull extracting cleaning feeders for cotton gins; and more particularly, to mechanism for effecting a variable speed of rotation of the feed rollers commonly employed in devices of this character.

The main object of the invention is to provide a cotton feeder with means, connected to one of the feed rollers, to operate both rollers at a proper speed to take care of the feeding of the particular kind or condition of cotton which is intended to be cleaned.

Other objects of the invention will become apparent as the detailed description thereof proceeds.

In the drawings:

Figure 1 is a side elevation of a hull extracting cleaning feeder, provided with the change speed mechanism which forms the subject matter of this application;

Figure 2 is an elevation, to an enlarged scale, of the variable speed drive arranged in its casing, with the cover removed;

Figure 3 is a horizontal section taken on the line 3—3 of Figure 2;

Figure 4 is a vertical transverse section taken on the line 4—4 of Figure 2; and Figure 5 is a vertical transverse section taken on the line 5—5 of Figure 2.

Referring to the drawings, in which similar parts are designated by like numerals:

The change speed gearing is mounted in a casing 6, provided with a cover 7, adapted to be secured detachably to the casing 6 by means of lag screws 8, the corners of the casing being provided with screwthreaded bores 9, to receive the external screw threads on the lag screws 8.

The back wall 9 of the casing 6 is provided with a boss 10 apertured to form a bearing for a sleeve 11 which is rotatably mounted on a shaft 12, the sleeve forming a bearing for the aforesaid shaft. The cover 7 is also provided with a boss 13 which is apertured to form a bearing for the shaft 12; and the shaft 12 has fixed to its outer end a pulley 14 adapted to be connected by a belt 15 to a pulley 16, suitably keyed or otherwise secured to one of the driven shafts of the feeder cleaner, such as the shaft 17 of the saw cylinder which projects through the end wall 18 of the cleaner, which is designated generally by the reference numeral 19.

An eccentric 20 is fixed to the shaft 12 as by the key 21. This eccentric 20 is designed to reciprocate a pair of clutch operating slides 22 and 23. The slide 22 is provided at one end with a cylindrical projection 24 mounted to slide in an aperture formed in cooperating guide members 25 and 26, the guide member 25 being formed integral with the rear wall 9 of the casing, while the guide member 26 is formed integral with the cover 7 (see Figure 3).

The slide 22 at its other end is provided with an extension 27, pivotally connected to a pair of arms 28 and 29, projecting upwardly from a ring bearing 30 forming one of the elements of a friction clutch. The other element of the friction clutch comprises a hub 31, keyed to one end of a feed roller shaft 32 projecting through the end wall 18 of the feeder. The hub is provided with a series of notches 33, in each of which is provided a roller 34, pressed normally toward the periphery of the hub by means of the springs 35 seated in recesses formed in the projecting arms 36 of the hub. The ring bearing 30 and the hub and roller element just described, constitute a very common form of friction clutch, and therefore need not be further described.

To oscillate the ring bearing 30 about the hub 31, the slide 22 has formed integral therewith, a downwardly projecting plate 37 extending substantially across the entire width of the casing 6 (see Figure 3). The plate 37 extends below the line joining the axes of the shafts 12 and 32 a distance sufficient to ensure proper reciprocation by the eccentric 20.

A second ring bearing 30' is freely mounted on the shaft 32. The clutch elements within this ring bearing 30' are structurally the same as those already described in connection with the ring bearing 30. These elements are, therefore, identified with the same reference numeral primed, as shown in Figure 2 of the drawings. The slide 23 is provided at one end with a cylindrical projection 38, mounted to slide in cooperating guide members 39 and 40, the member 39 being formed integral with the back wall 9 of the casing 6 and the member 40 being formed integral with the inside wall of the cover 7 (see Figure 3). The other end of the slide 23 is provided with an extension 41, which is pivotally connected to the arms 28' and 29', extending downwardly from the ring bearing 30'.

A compression spring 42 surrounds the projection 24 and abuts at one end against the cooperating guide members 25 and 26, the other end abutting against a collar 43, suitably secured to the projection 24. A compression spring 44 also surrounds the projection 38 and abuts at its opposite ends against the cooperating guide members 39 and 40, and a collar 45 suitably secured to the projection 38. A plate 46 projects upwardly from the slide 23 above the line joining the axes of the shafts 12 and 32, and extends substantially across the entire width of the casing 6—see Figure 3.

It will be obvious from inspection of Figure 2 of the drawings, that rotation of the eccentric 20 will effect, through its wiping action on the plates 37 and 46, the oscillation of the ring bearings 30 and 30' to impart rotation to the feed roller shaft 32. It will be apparent also that the rate of rotation of the shaft 32 will depend upon the throw of the arms which project from the ring bearings. In order to regulate this throw, the sleeve 11 is provided at its opposite ends with stops 47 and 48, see Figure 2, adapted to be rotated into position to contact with the plates 37 and 46, respectively, and thereby limit the throw of the ring bearings 30 and 30'.

The sleeve 11 may be rotated into the desired adjusted position by means of an arm 49 which is provided at one end with a hub 50 suitably keyed to the sleeve 11, as shown in Figure 4 of the drawings. The free end of the arm 49 is pivoted to a rod 51, which is provided at its free end, with a handle 52 arranged in convenient position on the end wall 18 of the cleaning feeder. The rod 51 may be provided with a series of notches 53, adapted to seat in one end of a flange 54, suitably secured to, or forming a part of the end wall of the cleaning feeder.

The wall of the casing 6 may be provided with any desired number of internally screwthread bosses 55, adapted to receive lag screws (not shown) extending through the wall 18 of the feed. These bosses 55 form spacers for the casing 6 to permit proper operation of the stop adjusting arm 49 and its operating rod 51. These are details of construction which may be varied as desired to suit the structural details of the machine to which the mechanism may be applied.

It is believed the operation of this change speed mechanism will be apparent to persons skilled in the art without further description.

Numerous variations may doubtless be devised by persons skilled in the art without departing from the principles of my invention. I, therefore, desire no limitations to be imposed on my invention, except such as are indicated in the appended claims.

What I claim is:

1. A variable speed drive comprising a casing having spaced apart substantially parallel walls, a driving shaft journaled in said walls, a driven shaft extending into said casing parallel to the driving shaft, a pair of friction ratchets mounted on the driven shaft and each including a bearing ring having an arm extending radially therefrom and in a direction opposite to that of the arm on the adjacent ring, slides pivoted to said arms and mounted to reciprocate in said casing parallel to a line joining the axes of said shafts, each slide having a plate fixed thereto and extending across said line, an eccentric fixed to said driving shaft and interposed between said plates, yielding means for maintaining said plates in contact with said eccentric on the opposite sides of the axis of said driving shaft, and means rotatable on said driving shaft to limit the reciprocation of said slides toward the axis of said driving shaft.

2. The variable speed drive set forth in claim 1, and in which the last named means includes a sleeve rotatable on the drive shaft, stops extending in opposite directions from said sleeve, and means for adjusting said sleeve angularly about said drive shaft to limit the reciprocations of said slides toward the axis of said drive shaft.

3. A variable speed drive comprising a casing having substantially parallel spaced apart walls, a driving shaft journaled in said walls, a driven shaft extending into said casing substantially parallel to the driving shaft, friction clutches mounted on the driven shaft adjacent to each other, and each including an arm extending substantially perpendicular to the axis of the driven shaft and in a direction opposite to that of the arm on the adjacent clutch, slides mounted in said casing to reciprocate therein parallel to a line joining the axes of said shafts, each slide being pivotally connected to one of said arms, plates extending from said slides across said line on opposite sides of the axis of said driving shaft, an eccentric fixed to said driving shaft and interposed between said plates, yielding means for holding the slides in position to maintain their plates in contact with said eccentric, whereby the rotation of the driving shaft reciprocates the slides simultaneously in opposite directions to oscillate said arms and drive said driven shaft, and means to vary the movements of said slides toward the axis of the driving shaft.

4. The device set forth in claim 3 in which the last named means comprises a sleeve rotatable on the driving shaft, a pair of stops extending in opposite directions from said sleeve, means for adjusting the sleeve angularly about the axis of the driving shaft, and means for locking the sleeve in angularly adjusted position.

5. The device set forth in claim 3 in which the last named means comprises a pair of stops extending in opposite directions from and rotatable about said driving shaft, and mechanism for adjusting said means to hold the stops in positions to limit the reciprocation of said slides toward the axis of the driving shaft and thereby vary the throw of the friction clutches to determine the speed of rotation of the driven shaft.

6. A variable speed drive comprising a casing, a shaft journaled in said casing, a pair of friction ratchets mounted on said shaft and each including a bearing ring having an arm extending radially therefrom and in a direction opposite to that of the arm on the other ring, slides pivoted to said arm and mounted to reciprocate parallel to each other on opposite sides of the axis of said shaft, means for reciprocating said slides, and means for varying the distances of reciprocation of the slides in one direction to vary the throw of said arms and thereby vary the speed of rotation of said shaft.

7. The device set forth in claim 6 in which the last named means includes a counter shaft journaled in said casing, an eccentric fixed to said counter shaft, a plate extending from each of said slides across the line joining the axes of said shafts, and on opposite sides of said eccentric, yielding means for holding said slides with their plates in contact with the opposite sides of said eccentric, and stop mechanism angularly adjustable on said counter shaft into the path of movement of said plates to limit the reciprocation of the slides toward the axis of the counter shaft and thereby vary the speed of rotation of the feed roller shaft.

8. The device set forth in claim 6 in which the last named means includes a counter shaft journaled in said casing, an eccentric fixed to said counter shaft, a plate extending from each of said slides across the line joining the axes of said shafts, yielding means for holding said slides with their plates in contact with the diametrically opposite sides of said eccentric, a sleeve angularly adjustable on said counter shaft, stops extending radially in opposite directions from said sleeve, means for angularly adjusting said sleeve to position said stops in the path of movement of said plates to limit the reciprocation of the slides carrying them and thereby vary the speed of rotation of the feed roller shaft, and means for locking said sleeve with its stops in angularly adjusted position.

JEFFREY JOHN WALLACE.